(12) United States Patent
Littrell

(10) Patent No.: US 7,249,287 B2
(45) Date of Patent: Jul. 24, 2007

(54) METHODS AND APPARATUS FOR PROVIDING ALARM NOTIFICATION

(75) Inventor: Nathan Bowman Littrell, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 530 days.

(21) Appl. No.: 10/827,201

(22) Filed: Apr. 19, 2004

(65) Prior Publication Data

US 2005/0246593 A1   Nov. 3, 2005

(51) Int. Cl.
*G06F 11/00*   (2006.01)

(52) U.S. Cl. .......................... 714/47; 700/108; 340/511

(58) Field of Classification Search .................. 714/47; 700/109, 110, 108; 340/511, 3.1
See application file for complete search history.

(56) References Cited

U.S. PATENT DOCUMENTS

| | | | |
|---|---|---|---|
| 4,180,860 A | 12/1979 | Driscoll et al. | |
| 4,403,297 A | 9/1983 | Tivy | |
| 4,738,147 A | 4/1988 | Tomlin | |
| 4,862,142 A * | 8/1989 | Knight | 340/522 |
| 5,089,978 A | 2/1992 | Lipner et al. | |
| 5,666,325 A * | 9/1997 | Belser et al. | 367/95 |
| 5,764,509 A | 6/1998 | Gross et al. | |
| 5,978,525 A | 11/1999 | Shu et al. | |
| 5,987,398 A * | 11/1999 | Halverson et al. | 702/179 |
| 6,181,975 B1 | 1/2001 | Gross et al. | |
| 6,414,594 B1 * | 7/2002 | Guerlain | 340/506 |
| 6,452,493 B1 * | 9/2002 | Ma et al. | 340/533 |
| 6,505,475 B1 | 1/2003 | Zugibe et al. | |
| 6,556,957 B1 * | 4/2003 | Daumer | 702/193 |
| 6,599,028 B1 | 7/2003 | Shu et al. | |
| 6,678,635 B2 | 1/2004 | Tovinkere et al. | |
| 6,684,265 B2 | 1/2004 | Graf | |
| 7,030,746 B2 * | 4/2006 | Littrell et al. | 340/500 |
| 2001/0007085 A1 * | 7/2001 | Sugikawa | 700/121 |
| 2002/0010563 A1 | 1/2002 | Ratteree et al. | |
| 2002/0044325 A1 * | 4/2002 | Noguti | 359/189 |
| 2002/0072882 A1 | 6/2002 | Kruger et al. | |
| 2007/0050684 A1 * | 3/2007 | Takaoka et al. | 714/47 |

* cited by examiner

*Primary Examiner*—Marc Duncan
(74) *Attorney, Agent, or Firm*—Armstrong Teasdale LLP

(57) ABSTRACT

A method for indicating an alarm condition in an industrial process includes measuring a parameter of the industrial process that varies over time and determining at least one parameter limit as a function of the parameter and also varying over time. The method further includes comparing the parameter to the parameter limit or limits and indicating an alarm condition when the parameter is outside of a bound set by the parameter limit or limits when the parameter is compared to the parameter limit or limits.

42 Claims, 3 Drawing Sheets

METHODS AND APPARATUS FOR PROVIDING ALARM NOTIFICATION

BACKGROUND OF THE INVENTION

This invention relates generally to methods and apparatus that provide automatic notification of machine malfunctions.

Operators of significant equipment or processes need warning of equipment or process malfunction. Such equipment can include machinery in power plants, oil refineries, pipeline pumping stations, manufacturing facilities, and any other appropriate applications. Known threshold-based alarms can be used, and such alarms provide an operator to use remedial tools and procedures to correct malfunction conditions. However, alarms based on parameter thresholds may not be timely enough to allow an operator to use such tools and procedures optimally in all conditions.

BRIEF DESCRIPTION OF THE INVENTION

Some configurations of the present invention therefore provide a method for indicating an alarm condition in an industrial process. The method includes measuring a parameter of the industrial process that varies over time and determining at least one parameter limit as a function of the parameter and also varying over time. The method further includes comparing the parameter to the parameter limit or limits and indicating an alarm condition when the parameter is outside of a bound set by the parameter limit or limits when the parameter is compared to the parameter limit or limits.

Also, some configurations of the present invention provide an apparatus for indicating an alarm condition in an industrial process. The apparatus includes a sensor configured to measure a parameter of the industrial process, a data acquisition system, and a computer. The apparatus is configured to measure a time-varying parameter of the industrial process and determine at least one parameter limit that is a function of the parameter and also varies over time. The apparatus is further configured to compare the parameter to the parameter limit or limits and indicate an alarm condition when the parameter is outside a bound set by the parameter limit or limits when the parameter is compared to the parameter limit or limits.

In addition, some configurations of the present invention provide a medium having machine-readable instructions recorded thereon that are configured to instruct a computer to input a sensed, time-varying parameter of an industrial process, determine at least one parameter limit as a function of the parameter and also varying over time. The instructions also are configured to instruct a computer to compare the parameter to the parameter limit or limits, and indicate an alarm condition when the parameter is outside of a bound set by the parameter limit or limits when the parameter is compared to the parameter limit or limits.

In yet another aspect of the present invention, there is provided a method for indicating an alarm condition in an industrial process. The method includes measuring a time-varying parameter of the industrial process, latching the parameter and buffering the latched parameter in a FIFO (first-in, first-out) buffer, and determining statistical functions of values of the buffered parameter stored in the FIFO buffer. The method further includes utilizing the determined statistical functions to determine one or more alert limits, comparing value of the parameter to the one or more alert limits; and indicating an alarm dependent upon the parameter being outside a bound set by the one or more alert limits.

Furthermore, some configurations of the present invention provide an apparatus for indicating an alarm condition in an industrial process. The apparatus is configured to latch a varying parameter value of the industrial process and buffer successive latched parameter values in a FIFO (first-in, first-out) buffer, determine statistical functions of values of the buffered parameter stored in the FIFO buffer, and utilize the determined statistical functions to determine one or more alert limits. The apparatus is further configured to compare value of the parameter to the one or more alert limits, and indicate an alarm dependent upon the parameter being outside a bound set by the one or more alert limits.

Some configurations of the present invention provide a medium having recorded thereon machine-readable instructions configured to instruct a computer to latch a varying parameter value of an industrial process and buffer successive latched parameter values in a FIFO (first-in, first-out) buffer and determine statistical functions of values of the buffered parameter stored in said FIFO buffer. The instructions are also configured to instruct a computer to utilize the determined statistical functions to determine one or more alert limits, compare value of the parameter to the one or more alert limits, and indicate an alarm dependent upon the parameter being outside a bound set by the one or more alert limits.

Configurations of the present invention allow early notification in accordance with behavior that might not trip a conventional threshold based alarm system. Additionally, configurations of the present invention avoid inappropriate alarms that may occur with conventional alarm systems that are not cognizant of machine state (e.g., whether the machine is running or not).

DETAILED DESCRIPTION OF THE INVENTION

Figure 1:
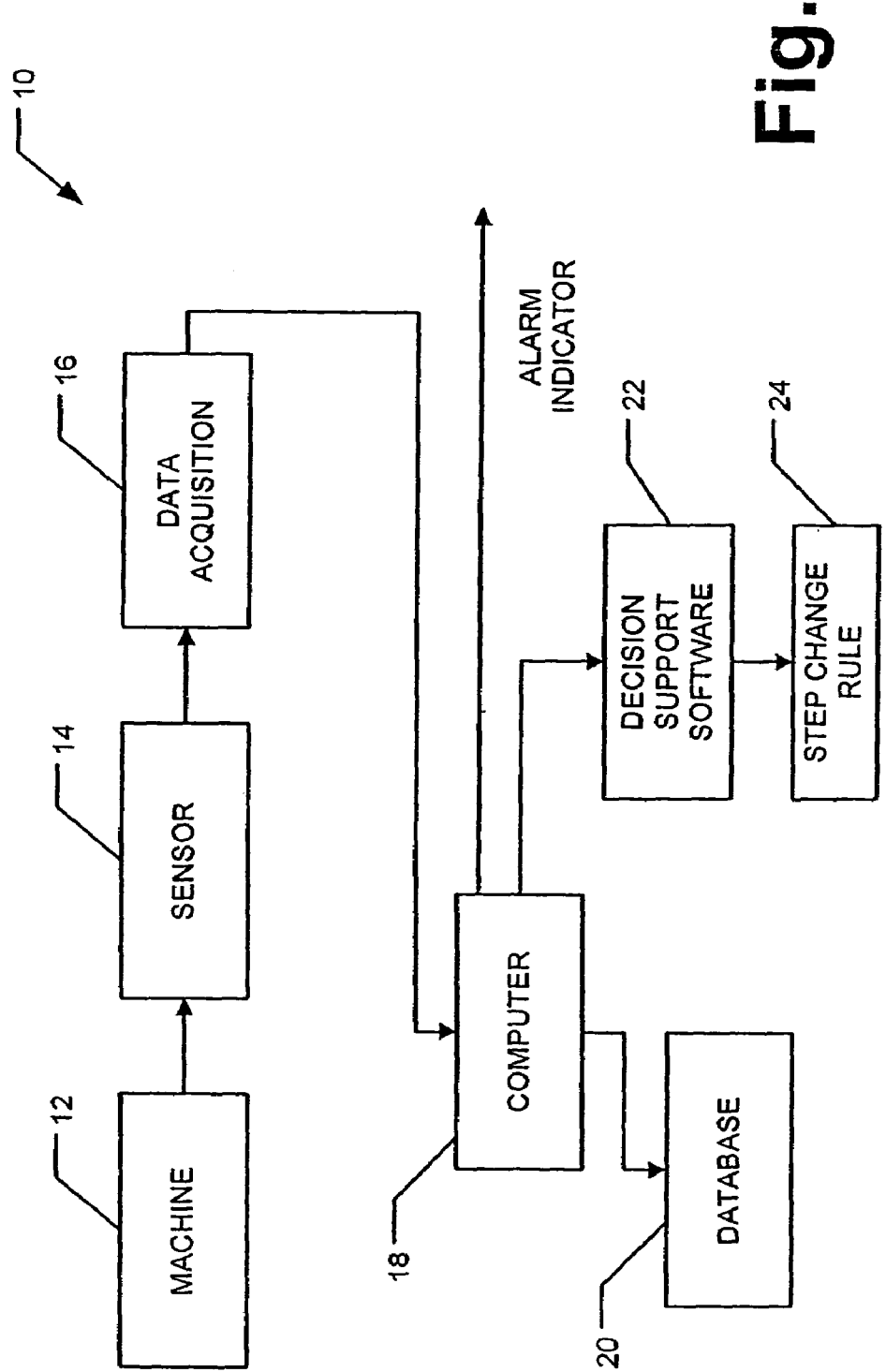
FIG. 1 is a block diagram of an industrial process in which a configuration of the present invention is provided to indicate an alarm when a step change in a parameter is encountered.

A technical effect of some configurations of the present invention is to track a measurand (e.g., vibration magnitude or phase) and, using the measurand, generate a result or raise an alarm when one or more configurable criteria are met (e.g., a statistically defined step change of the measurand). An additional technical effect of the present invention is to provide one or more time based criteria to qualify the data before raising an alarm. Some configurations permit a user to add additional preconditions to the rule to qualify data before raising an alarm. As used herein, a "measurand" is a measurable parameter of an industrial process.

In some configurations 10 of the present invention and referring to FIG. 1, an industrial machine or apparatus 12 (hereinafter "machine") has an operating characteristic that is subject to alarm conditions. A non-exhaustive list of such machines 12 includes gas turbines, steam turbines, electric generators, electric motors, pumps, gearboxes, and bearings. The operating characteristic subject to alarm conditions is sensed by one or more sensors 14. A non-exhaustive list of operating conditions that can be sensed by the one or more sensors 14 include pressure, temperature, position, acceleration, velocity, power, current, and flow. Not all of these operating conditions are appropriate for each type of machine 12, but the choice of which one or more appropriate conditions are to be sensed by the one or more sensors 14 is left as a design choice. A data acquisition system 16 receives data from the one or more sensors 14. Data acquisition system 16 can comprise, for example, networked hardware, a portable data collection unit, an internal computer or controller, or a data acquisition card in a computer system. Data acquisition system 16 is networked in some configurations to a computer 18, which in some configurations, includes or otherwise has access to a database 20. Computer 18 executes a program comprising decision support software or firmware 22, which, in turn, includes a step change rule module 24. In some configurations, database 20 contains variables that can be used for adjusting the sensitivity of step change rule module 24 in accordance with the type of machine 12 being monitored and the time—varying parameter or parameters measured by sensor 14. Decision support software 22 and step change rule 24 may be provided in the form of a computer readable medium (not shown in FIG. 1), such as a floppy diskette, CD-ROM, or DVD, having recorded thereon instructions configured to instruct computer 18 to perform the operations described below.

Step change rule module 24 is configured to track a "normal" variation of a parameter. A sudden change in this parameter will cause decision support software 22 to instruct computer 18 to raise an alarm indication. Alarm indication 18, in some configurations of the present invention, activates an audible or visual alarm device or a plurality or combination of alarm devices. Step change rule module 24 provides an upper and a lower bound for each parameter tracked by the one or more sensors 14. For example, one time-varying parameter is tracked utilizing limits D and E written as follows:

$$D = \text{average}(A) + B \times \text{std\_dev}(A) + C, \text{ and}$$

$$E = \text{average}(A) - B \times \text{std\_dev}(A) - C,$$

where:

A is a value associated with the parameter (for example, the parameter value itself, or a scaled and/or possibly offset value of the parameter), which in some configurations includes a sample delay;

B is a constant multiplier;

C is a constant added to prevent a width of a window of acceptance between D and E from being narrowed to zero as a result of the standard deviation of A approaching or equaling zero;

D is a time-varying upper acceptance limit; and

E is a time-varying lower acceptance limit; also average(A) and std_dev(A) are the average value of A over time and a standard deviation of A over time, respectively.

The current (or, in some configurations, a delayed) sample A is compared to upper and lower limits D and E, respectively. If A is outside of these limits, computer 18 is instructed to raise a suitable alarm notification, such as a displayed or audible alarm. The displayed or audible alarm need not be located on computer 18 itself, but may be an alarm raised in a portion of or throughout a manufacturing or power generation plant, for example, depending upon the nature of the parameter A being measured. In some configurations, parameter A is buffered (i.e., delayed) by a few samples so that the limits do not open up immediately in response to a step change event, thus preventing a valid alarm condition from being triggered.

In some configurations of the present invention, the value of B is taken to be zero, i.e., there is no standard deviation term in the expressions for D or E.

In some configurations, the constant term C is zero, i.e., there is no constant term in the expressions for D or E.

In some configurations, the std_dev( ) function is replaced by another statistical measure of data variation. Replacement of the std_dev( ) function is considered appropriate in case of data that is not normally distributed.

In some configurations of the present invention, the constant B is set to 1. Also, in some configurations of the present invention, a one-sided alarm limit is provided, i.e., only either upper limit D or lower limit E is determined and/or used and alarms raised in accordance with only the one limit. And in some configurations of the present invention the Average( ) function is replaced with another statistical variable, for example, median( ) or mode( ).

Boundary D or E, or the combination of both, track a "normal" (in the sense of acceptable) variation of a parameter such as vibration, temperature, power output, or any of the examples of variable A listed above, or other parameters. Any sudden change will cause an alarm to be raised. Varying the size of a buffer used to determine averages (or other statistical variable) determines how quickly adjustment is made to level changes. Changing the value of B in various configurations affects the sensitivity of the alarm to individual sample variations. The constant C controls a minimum acceptable window size. Additionally, the sample rate (i.e., data collection frequency) affects alarm behavior in conjunction with sample delay (or sample buffer size), as the product of the sample rate and sample buffer size determines the time period represented by data in the buffer.

Early warnings of step changes in the characteristics of machine operation can be provided with some configurations of the present invention. For example, in some configurations of the present invention, an average and standard deviation of a set of values stored in a FIFO buffer of variable (configurable) length. An upper and lower bound is determined by adding and subtracting the standard deviation to the average value of the buffer. The standard deviation value may be further modified by a multiplier depending on application. A constant is also added to the standard deviation value to prevent the tolerance window going to zero when data is steady. An alarm is generated when the incoming value is outside of the tolerance bounds described above.

Figure 2:
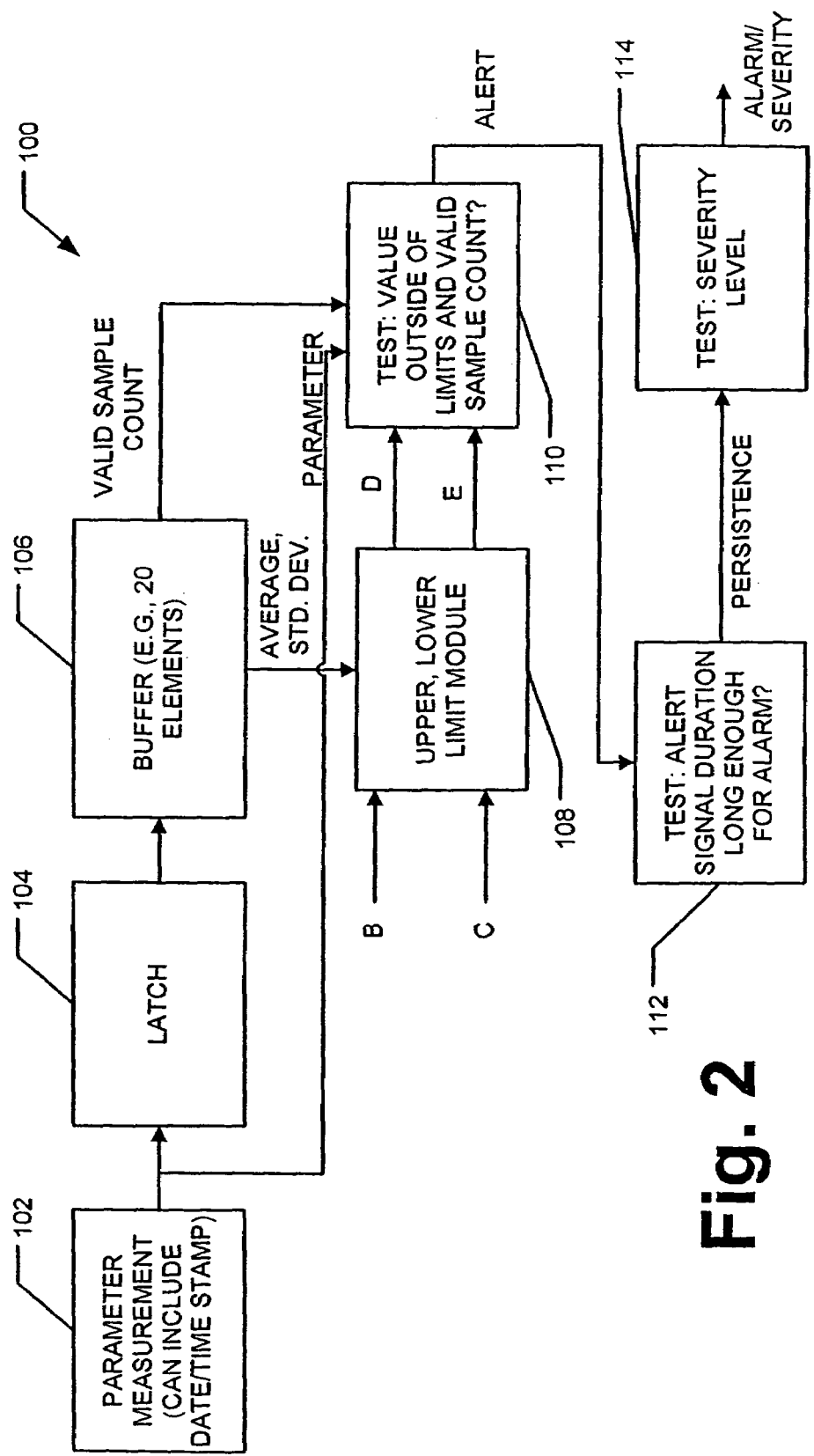
FIG. 2 is a block diagram representative of another configuration of the present invention.

Thus, in some configurations 100 of the present invention and referring to FIG. 2, a technical effect of the present invention is achieved by a parameter measurement 102 being latched by latch 104 at suitable intervals, e.g., once every four seconds, or at any other interval suitable for observing and monitoring the industrial process. Latch 104 feeds a FIFO (first-in, first-out) buffer 106, which holds a predetermined number of values of the latched parameter. For example, and not by way of limitation, some configurations of the present invention include a 20 element FIFO, which holds the last 20 latched values of the parameter. Other configurations hold a different number of latched values, and in some configurations of the present invention, the size of FIFO buffer 106 is configurable to allow tuning of the sensitivity to sudden spikes in the parameter value. (For example, a longer buffer is less sensitive to short spikes in the parameter value.) Some configurations of the present invention determine one or more statistical functions (e.g., standard deviation and average) of the latched values for each interval and provide this information to a limit module 108, which utilizes the one or more determined statistical functions to determine one or more alert limits. Module 108 may also utilize configurable inputs, as described in conjunction with the various equations disclosed above. In some configurations of the present invention, the statistical functions and alert limits are redetermined each time a new value of the parameter is latched and shifted into buffer 106. Also, in some configurations, the statistical values are not necessarily standard deviation and mean, but may include other suitable statistical measures, such as median or mode, or another measure of parameter variance.

A value of the measured parameter is then compared to the one or more alert limits at module 110. If the parameter is outside a bound set by the one or more alert limits, an alarm may be raised by an alert signal. In some configurations, the alert signal directly controls one or more audible or visual alarm systems. In some configurations, an alarm is not raised unless a step change persists for a period of time, as determined by block 112. The length of time required for an alarm indication is configurable in some configurations of the present invention. Also, some configurations of the present invention also provide a severity level indication based on the persistence of the alarm using a severity level module 114.

In configurations in which parameter measurements are time-stamped, the time stamp information can be logged when an alarm indication is raised.

Some configurations of the present invention inhibit an alarm signal unless a sufficient number of valid samples of the parameter are held in buffer 106. Also, some configurations of the present invention utilize a value of a parameter latched by latch 104 rather than a current measurement in the test to determine whether the parameter is out of bounds.

Some configurations of the present invention do not include modules 112 and 114, in which case the "alert" signal is used to raise an alarm. Also, some configurations of the present invention do not include block 114, in which case, the signal labeled "persistence" is used to raise an alarm.

Software utilized to implement the flow chart of FIG. 2 can be used in configurations of the present invention represented in FIG. 1. For example, latch 104 and buffer 106 can be considered in many configurations to comprise decision support software 22, and modules 108, 110, 112, and 114 may be considered to comprise step change rule 24. It is to be understood that the configuration represented in FIG. 2 is only one of many software configurations that can be used as decision support software 22 and step change rule 24.

Figure 3:
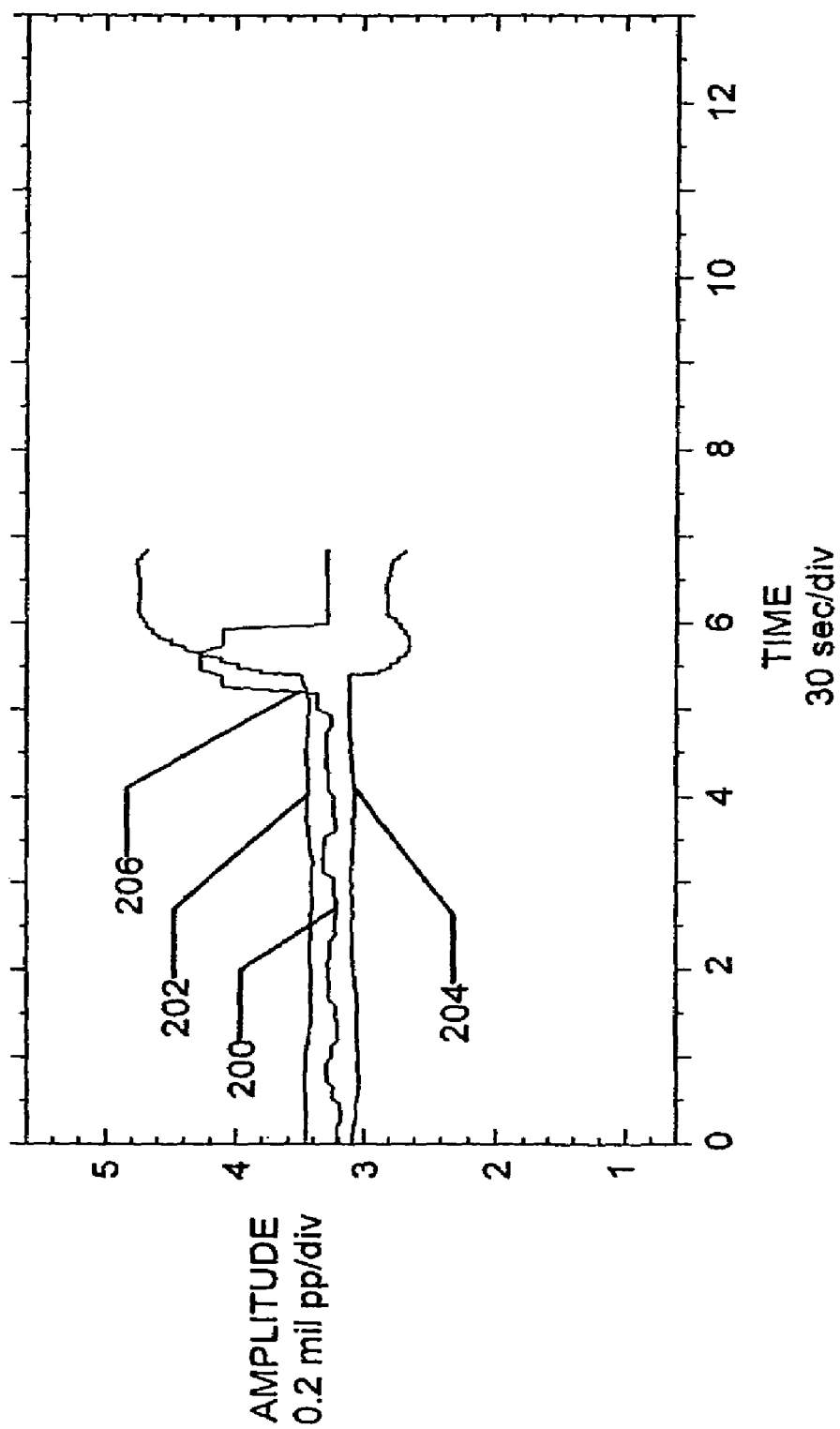
FIG. 3 is a drawing showing a step change in a measured parameter.

FIG. 3 is a graph showing a step change in a parameter. Line 200 is indicative of the parameter value in FIG. 3. Line 202 is indicative of the upper limit for the parameter and line 204 is indicative of the lower limit for the parameter. An alarm is raised at a time indicated at 206.

The parameter or measurand may be any quantity of interest. Secondary configurable parameters can be applied in some configurations, including, for example, the value of the multiplier for the standard deviation, the value of the constant added to the standard deviation, the size of the buffer, and the sample rate of the buffer. A logical on/off measurement is the output of the rule, corresponding to the signal that raises the alarm. In some configurations, a quantitative severity indication may also be provided and either recorded or used to modulate or otherwise vary the alarm.

Configurations of the present invention can be used to alert machine operators far in advance of developing problems. Advantageously, configurations of the present invention trigger an alarm when a parameter changes in a statistically significant way rather than after a threshold level is crossed.

Configurations of the present invention can be used to provide early warning of problems with machinery in power plants, oil refineries, pipeline pumping stations, manufacturing facilities, and any other appropriate applications. A configurable buffer length in some configurations of the present invention allows tuning of the sensitivity to sudden spikes in parameter values. Some configurations of the present invention are suitable for use in providing alarms for data collected from nuclear reactor coolant pumps and drive turbines.

While the invention has been described in terms of various specific embodiments, those skilled in the art will recognize that the invention can be practiced with modification within the spirit and scope of the claims.

What is claimed is:

1. A method for indicating an alarm condition in an industrial process, said method comprising:
    measuring a parameter of the industrial process, said parameter varying over time;
    determining at least one parameter limit, said at least one parameter limit being a function of said parameter and varying over time;
    buffering said parameter;
    comparing, using a time-delayed value of said parameter, said parameter to said at least one parameter limit; and
    indicating an alarm condition when said parameter is outside of a bound set by said at least one parameter limit at a time when said parameter is compared to said at least one parameter limit.

2. A method in accordance with claim 1 wherein said at least one parameter limit comprises an upper limit and a lower limit.

3. A method in accordance with claim 2 wherein said upper limit is an average value of the parameter plus a predetermined constant multiple of a standard deviation of the parameter, and said lower limit is the average value of the parameter minus the predetermined constant multiple of the standard deviation of the parameter.

4. A method in accordance with claim 2 wherein said upper limit is an average value of the parameter plus a predetermined first constant plus a predetermined second constant multiple of a standard deviation of the parameter, and said lower limit is the average value of the parameter minus the predetermined first constant plus the predetermined second constant multiple of the standard deviation of the parameter.

5. A method in accordance with claim 2 wherein said upper limit is an average value of the parameter plus a predetermined constant and said lower limit is an average value of the parameter minus a predetermined constant.

6. A method in accordance with claim 2 wherein said upper limit and said lower limit are functions of a median value of said parameter.

7. A method in accordance with claim 2 wherein said upper limit and said lower limit are functions of a mode of sampled values of said parameter.

8. A method in accordance with claim 1 wherein the industrial process includes at least one apparatus selected from the group consisting of a gas turbine engine, a steam turbine, an electric generator, an electric motor, a pump, a gearbox, and bearings, and said parameter is selected from the group consisting of pressure, temperature, position, acceleration, velocity, power, current, and fluid flow.

9. An apparatus for indicating an alarm condition in an industrial process, said apparatus comprising a sensor configured to measure a parameter of the industrial process, a data acquisition system, and a computer, said apparatus configured to:
measure a parameter of the industrial process, said parameter varying over time;
determine at least one parameter limit, said at least one parameter limit being a function of said parameter and varying over time;
buffer said parameter;
compare, using a time-delayed value of said parameter, said parameter to said at least one parameter limit; and
indicate an alarm condition when said parameter is outside of a bound set by said at least one parameter limit at a time when said parameter is compared to said at least one parameter limit.

10. An apparatus in accordance with claim 9 wherein said at least one parameter limit comprises an upper limit and a lower limit.

11. An apparatus in accordance with claim 10 wherein said upper limit is an average value of the parameter plus a predetermined constant multiple of a standard deviation of the parameter, and said lower limit is the average value of the parameter minus the predetermined constant multiple of the standard deviation of the parameter.

12. An apparatus in accordance with claim 10 wherein said upper limit is an average value of the parameter plus a predetermined first constant plus a predetermined second constant multiple of a standard deviation of the parameter, and said lower limit is the average value of the parameter minus the predetermined first constant plus the predetermined second constant multiple of the standard deviation of the parameter.

13. An apparatus in accordance with claim 10 wherein said upper limit is an average value of the parameter plus a predetermined constant and said lower limit is an average value of the parameter minus a predetermined constant.

14. An apparatus in accordance with claim 10 wherein said upper limit and said lower limit are functions of a median value of said parameter.

15. An apparatus in accordance with claim 10 wherein said upper limit and said lower limit are functions of a mode of sampled values of said parameter.

16. An apparatus in accordance with claim 10 wherein the industrial process includes at least one apparatus selected from the group consisting of a gas turbine engine, a steam turbine, an electric generator, an electric motor, a pump, a gearbox, and bearings, and said parameter is selected from the group consisting of pressure, temperature, position, acceleration, velocity, power, current, and fluid flow.

17. A medium having machine-readable instructions recorded thereon that are configured to instruct a computer to:
input a sensed parameter of an industrial process, said parameter varying over time;
determine at least one parameter limit, said at least one parameter limit being a function of said parameter and varying over time;
buffer said parameter;
compare, using a time-delayed value of said parameter, said parameter to said at least one parameter limit; and
indicate an alarm condition when said parameter is outside of a bound set by said at least one parameter limit at a time when said parameter is compared to said at least one parameter limit.

18. A medium in accordance with claim 17 wherein said at least one parameter limit comprises an upper limit and a lower limit.

19. A medium in accordance with claim 18 wherein said upper limit is an average value of the parameter plus a predetermined constant multiple of a standard deviation of the parameter, and said lower limit is the average value of the parameter minus the predetermined constant multiple of the standard deviation of the parameter.

20. A medium in accordance with claim 18 wherein said upper limit is an average value of the parameter plus a predetermined first constant plus a predetermined second constant multiple of a standard deviation of the parameter, and said lower limit is the average value of the parameter minus the predetermined first constant plus the predetermined second constant multiple of the standard deviation of the parameter.

21. A medium in accordance with claim 18 wherein said upper limit is an average value of the parameter plus a predetermined constant and said lower limit is an average value of the parameter minus a predetermined constant.

22. A medium in accordance with claim 18 wherein said upper limit and said lower limit are functions of a median value of said parameter.

23. A medium in accordance with claim 18 wherein said upper limit and said lower limit are functions of a mode of sampled values of said parameter.

24. A medium in accordance with claim 17 wherein the industrial process includes at least one apparatus selected from the group consisting of a gas turbine engine, a steam turbine, an electric generator, an electric motor, a pump, a gearbox, and bearings, and said parameter is selected from the group consisting of pressure, temperature, position, acceleration, velocity, power, current, and fluid flow.

25. A method for indicating an alarm condition in an industrial process, said method comprising:
measuring a parameter of the industrial process, said parameter varying over time;
latching said parameter and buffering said latched parameter in a FIFO (first-in, first-out) buffer;
determining statistical functions of values of said buffered parameter stored in said FIFO buffer;
utilizing said determined statistical functions to determine one or more alert limits;
comparing value of the parameter to said one or more alert limits; and
indicating an alarm dependent upon said parameter being outside a bound set by the one or more alert limits.

26. A method in accordance with claim 25 wherein said comparing the value of the parameter to said one or more alert limits comprises comparing a present value of the parameter to the alert limits.

27. A method in accordance with claim 25 wherein said comparing the value of the parameter to said one or more alert limits comprises comparing a latched value of the parameter to the alert limits.

28. A method in accordance with claim 25 wherein said indicating an alarm dependent upon said parameter being outside a bound set by the one or more alert limits further comprises determine whether the parameter is outside said bound for a sufficiently long time to indicate an alarm.

29. A method in accordance with claim 28 further comprising indicating a severity level of the alarm, the severity level being dependent upon the length of time the parameter is outside said bound.

30. A method in accordance with claim 25 wherein said comparing the value of the parameter to said one or more alert limits further comprises inhibiting an alarm if a valid sample count of parameter values buffered in the FIFO is less than a predetermine value.

31. An apparatus for indicating an alarm condition in an industrial process, said apparatus configured to:
   latch a varying parameter value of the industrial process and buffer successive latched parameter values in a FIFO (first-in, first-out) buffer;
   determine statistical functions of values of said buffered parameter stored in said FIFO buffer;
   utilize said determined statistical functions to determine one or more alert limits;
   compare value of the parameter to said one or more alert limits; and
   indicate an alarm dependent upon said parameter being outside a bound set by the one or more alert limits.

32. An apparatus in accordance with claim 31 wherein to compare the value of the parameter to said one or more alert limits, said apparatus is configured to compare a present value of the parameter to the alert limits.

33. An apparatus in accordance with claim 31 wherein to compare the value of the parameter to said one or more alert limits, said apparatus is configured to compare a latched value of the parameter to the alert limits.

34. An apparatus in accordance with claim 31 wherein to indicate an alarm dependent upon said parameter being outside a bound set by the one or more alert limits, said apparatus is further configured to determine whether the parameter is outside said bound for a sufficiently long time to indicate an alarm.

35. An apparatus in accordance with claim 34 further configured to indicate a severity level of the alarm, the severity level being dependent upon the length of time the parameter is outside said bound.

36. An apparatus in accordance with claim 31 wherein to compare the value of the parameter to said one or more alert limits, said apparatus is further configured to inhibit an alarm if a valid sample count of parameter values buffered in the FIFO is less than a predetermine value.

37. A medium having recorded thereon machine-readable instructions configured to instruct a computer to:
   latch a varying parameter value of an industrial process and buffer successive latched parameter values in a FIFO (first-in, first-out) buffer;
   determine statistical functions of values of said buffered parameter stored in said FIFO buffer;
   utilize said determined statistical functions to determine one or more alert limits;
   compare value of the parameter to said one or more alert limits; and
   indicate an alarm dependent upon said parameter being outside a bound set by the one or more alert limits.

38. A medium in accordance with claim 37 wherein to compare the value of the parameter to said one or more alert limits, said instructions are configured to instruct a computer to compare a present value of the parameter to the alert limits.

39. A medium in accordance with claim 37 wherein to compare the value of the parameter to said one or more alert limits, said instructions are configured to instruct a computer to compare a latched value of the parameter to the alert limits.

40. A medium in accordance with claim 37 wherein to indicate an alarm dependent upon said parameter being outside a bound set by the one or more alert limits, said instructions are further configured to instruct a computer to determine whether the parameter is outside said bound for a sufficiently long time to indicate an alarm.

41. A medium in accordance with claim 40 further having instructions recorded thereon that are configured to instruct a computer to indicate a severity level of the alarm, the severity level being dependent upon the length of time the parameter is outside said bound.

42. A medium in accordance with claim 37 wherein to compare the value of the parameter to said one or more alert limits, said instructions are further configured to instruct the computer to inhibit an alarm if a valid sample count of parameter values buffered in the FIFO is less than a predetermine value.

* * * * *